United States Patent [19]

Matsunaga et al.

[11] Patent Number: 4,642,203

[45] Date of Patent: Feb. 10, 1987

[54] METHOD OF TREATING LOW-LEVEL RADIOACTIVE WASTE

[75] Inventors: Ichiro Matsunaga, Tokyo; Hiroshi Sugai, Ibaragai, both of Japan

[73] Assignee: Sumitomo Metal Mining Co., Ltd., Tokyo, Japan

[21] Appl. No.: 620,087

[22] Filed: Jun. 13, 1984

[30] Foreign Application Priority Data

Jun. 15, 1983 [JP] Japan ............................... 58/107409

[51] Int. Cl.[4] .......................... G21F 9/04; G21F 9/12; C02F 1/42; C02F 1/70

[52] U.S. Cl. .................................... 252/631; 210/669; 210/682; 210/757; 252/627; 423/2; 423/6; 423/DIG. 14

[58] Field of Search ........................ 252/626, 627, 631; 423/2, 6, 10, 11, 22, DIG. 14; 210/663, 669, 682, 681, 757

[56] References Cited

U.S. PATENT DOCUMENTS

| | | | |
|---|---|---|---|
| 3,725,293 | 4/1973 | Haas | 252/631 |
| 3,853,980 | 12/1974 | Berton | 252/631 |
| 3,980,750 | 9/1976 | Cousinou et al. | 252/627 |
| 3,987,145 | 10/1976 | Bruns et al. | 252/627 |
| 4,094,953 | 6/1978 | Hadi et al. | 376/186 |
| 4,116,863 | 9/1978 | Berton et al. | 252/631 |
| 4,278,559 | 7/1981 | Levenson et al. | 252/627 |
| 4,282,112 | 8/1981 | Fitoussi et al. | 252/627 |

FOREIGN PATENT DOCUMENTS

| | | | |
|---|---|---|---|
| 82/03722 | 10/1982 | World Int. Prop. O. | 252/631 |

OTHER PUBLICATIONS

Watari et al., 1966, Concentration of Radionuclides in Sea Water by Ferric Hydroxide-Cation Exchange Resin, Journal of Atomic Energy of Japan, vol. 8 (3):130–133.

*Primary Examiner*—Stephen J. Lechert, Jr.
*Assistant Examiner*—Howard J. Locker
*Attorney, Agent, or Firm*—Watson, Cole, Grindle & Watson

[57] ABSTRACT

Hydrazine is added to low-level radioactive waste, and the waste is contacted with an iron hydroxide-cation exchange resin so that its radioactive concentration may be lowered. The resin is a strongly acid cation exchange resin treated with ferric chloride and aqueous ammonia and containing a product of hydrolysis of ferric ions.

3 Claims, No Drawings

METHOD OF TREATING LOW-LEVEL RADIOACTIVE WASTE

BACKGROUND OF THE INVENTION

1. Field of the Invention

This invention relates to a method of treating low-level radioactive waste discharged from, for example, an enriched uranium conversion process.

2. Description of the Prior Art

An enriched uranium oxide is used as atomic fuel for a light water reactor. As natural uranium contains only about 0.7% of $^{235}U$ which contributes to nuclear fission, it is usual practice to convert a natural uranium oxide to $UF_6$, enrich $UF_6$ by, for example, gaseous diffusion or centrifugal separation so that it may contain about 3% of $^{235}U$, and reconvert the enriched $UF_6$ to $UO_2$.

The following methods are known for the wet reconversion of enriched $UF_6$ to $UO_2$:

(1) $UF_6$ is blown into an aqueous solution of aluminum nitrate for hydrolysis, and pure uranyl nitrate $[UO_2(NO_3)_2]$ is obtained by solvent extraction. Ammonia is added to an aqueous solution thereof to form ammonium diuranate (ADU) $[(NH_4)_2U_2O_7]$. Ammonium diuranate is separated and calcined to form $U_3O_8$, and $U_3O_8$ is reduced in a hydrogen atmosphere to form $UO_2$ powder.

(2) Uranyl fluoride ($UO_2F_2$) is obtained by the hydrolysis of $UF_6$ in water, and ammonia is added to uranyl fluoride to form ammonium diuranate. It is calcined to form $U_3O_8$ and $U_3O_8$ is reduced to $UO_2$.

(3) Uranyl fluoride is obtained by the hydrolysis of $UF_6$ in steam, and $CO_2$ and ammonia are added to $UO_2F_2$ to form ammonium uranyl tricarbonate (AUC) $[(NH_4)_4(UO_2)(CO_3)_3]$. It is calcined to form $U_3O_8$ and $U_3O_8$ is reduced to $UO_2$.

The precipitated ammonium diuranate or ammonium uranyl tricarbonate is recovered by filtration, and the filtrate remaining thereafter is low-level radioactive waste. Standards are specified by law for discharging low-level radioactive waste from the system, and classified by nuclear species.

As the majority of enriched $UF_6$ presently used in Japan is obtained from natural uranium, all of the nuclear species which the low-level radioactive waste resulting from its reconversion contains are known, and the waste fully satisfies the standards for its discharge. If the uranium recovered by the reprocessing of spent fuel is used as a part of source material, however, it is possible that the low-level radioactive waste resulting from the reconversion of enriched $UF_6$ may have a higher radioactive concentration. Although the radioactivity of low-level radioactive waste has so far not presented any particular problem, a possible increase in the amount of uranium recycled from the reprocessing of spent fuel makes it urgently necessary to establish a method for removing radioactive nuclear specis from low-level radioactive waste.

SUMMARY OF THE INVENTION

It is an object of this invention to provide a method of reducing the radioactive concentration of low-level radioactive waste effectively.

This object is attained by a method which comprises adding hydrazine to low-level radioactive waste, and bringing it into contact with an iron hydroxide-cation exchange resin obtained by treating a strongly acid cation exchange resin with ferric chloride and aqueous ammonia to form a product of hydrolysis of ferric ions in the resin.

This invention enables an effective reduction in the radioactive concentration of low-level radioactive waste containing a very small quantity of nuclear species, and thereby provides an effective solution to the problem which may arise from an increase in the recovery of uranium from spent fuel. The method of this invention is not limited to the waste from the reconversion of uranium, but is also applicable to any low-level radioactive waste discharged from a variety of other stages in a nuclear fuel cycle.

DETAILED DESCRIPTION OF THE INVENTION

The iron hydroxide-cation exchange resin is an ion exchange resin which was originally developed for the enrichment of $^{9}Be$ in sea water. Various uses of the resin have hitherto been reported, including the collection of various radioactive species from sea water, as described, for example, in the Journal of the Atomic Energy of Japan, vol. 8, No. 3 (1966), pp. 130–133. This resin is obtained by treating a strongly acid cation exchange resin with ferric chloride and aqueous ammonia to form a product of hydrolysis of ferric ions therein. The paper hereinabove referred to states that the resin is not only effective for collecting the product of hydrolysis of iron, but also retains its cation exchange capacity.

The inventors of this invention conducted a series of tests to modify the iron hydroxide-cation exchange resin and apply it to the treatment of low-level radioactive waste. As a result, they have found it possible to lower the radioactive concentration of the waste effectively by adding hydrazine to the waste and contacting it with the resin.

It is possible to use any type of hydrazine, such as hydrazine hydrate, hydrochloride or sulfate. It is advisable to use at least 100 mg of hydrazine per liter of waste. A smaller amount of hydrazine results in a lower ratio of reduction in radioactive concentration (ratio of the radioactive concetration in the treated waste to that in the original waste). It is most appropriate to use about 400 mg of hydrazine per liter of waste, as no further increase is likely to achieve any appreciable reduction in radioactive concentration.

The temperature and pH level of the waste being treated also have an important bearing on a reduction in radioactive concentration. It is advisable to maintain the waste at a pH level of at least 7, since too low a pH level causes the elution of iron from the resin. It is most appropriate to maintain a pH level of about 8, since a higher pH level results in a lower ratio of reduction in radioactive concentration. It is, however, possible to retain a satisfactorily high ratio of reduction in radioactive concentration to some extent by increasing the amount of hydrazine. A high ratio of reduction in radioactive concentration can be obtained if the waste has a high temperature. It is, however, practical to employ a temperature of 50° C. to 60° C., since the ratio ceases to increase at a temperature exceeding 50° C. In the event it is impossible to raise the temperature of the waste, it is possible to increase the ratio to some extent if the pH of the waste is maintained in an optimum range, and if a larger amount of hydrazine is employed. In the event the waste has a pH level of about 8 and a temperature of 50° C. to 60° C., it is possible to lower its radioactive concentration to at least one-tenth by adding 100 mg of hydrazine per liter, or to about one-hundredth by adding 400 mg of hydrazine per liter.

An ordinary ion exchange apparatus can be used for contacting the waste with the resin. It is, for example, possible to pass the waste containing hydrazine downwardly or upwardly through a column filled with the resin.

The invention will now be described in further detail by way of example.

EXAMPLE 1

Five milliliters of a commercially available H type strongly acid cation exchange resin were dipped in an aqueous solution of ferric chloride having a concentration of 2 mols per liter, and the resin was, then, washed by water. A glass column having an inside diameter of 12.6 mm and a length of 240 mm was filled with the resin, and aqueous ammonia having a concentration of 2 mols per liter was introduced into the column. The supply of aqueous ammonia was stopped when the resin had become dark brown, and pure water was introduced to wash the resin until the washing water became neutral. An iron hydroxide-cation exchange resin was, thus, formed in the column. The column was used for treating a simulated low-level radioactive waste which had been obtained by blowing $NH_3$ into an aqueous solution of $UO_2(NO_3)_2$ to precipitate ammonium diuranate, collecting the precipitated ammonium diuranate by filtration and concentrating the filtrate so that it might have a radioactive concentration in the order of $10^{-5}$ microcurie (μCi)/ml. A series of tests were run by adding different quantities of hydrazine hydrate ($N_2H_4.H_2O$) under different conditions including a pH range of 5 to 10 and a temperature range of 20° C. to 80° C. The waste was introduced into the column at a rate of 100 ml per hour, and each test was conducted with 5000 ml of the waste. The test conditions, the original and final radioactive concentrations in the waste and the corresponding ratio of reduction in radioactive concentration are shown in TABLE 1.

TABLE 1

| Run No. | Hydrazine (mg/lit.) | pH | Temp. (°C.) | Radioactive conc. (μCi/ml) Original | Final | Ratio of reduction |
|---|---|---|---|---|---|---|
| 1 | 1600 | 8.0 | 20 | $1.6 \times 10^{-5}$ | $1.7 \times 10^{-6}$ | 1/9 |
| 2 | 800 | " | " | " | $2.5 \times 10^{-6}$ | 1/6 |
| 3 | 400 | " | " | " | $2.7 \times 10^{-6}$ | " |
| 4 | " | " | 30 | " | $1.7 \times 10^{-6}$ | 1/9 |
| 5 | " | " | 40 | " | $5.3 \times 10^{-7}$ | 1/30 |
| 6 | " | " | 50 | " | $1.8 \times 10^{-7}$ | 1/89 |
| 7 | " | " | 60 | " | $1.7 \times 10^{-7}$ | 1/94 |
| 8 | " | " | 80 | " | " | " |
| 9 | " | 5.0 | 55 | " | $4.2 \times 10^{-6}$ | 1/4 |
| 10 | " | 6.0 | " | " | $2.7 \times 10^{-6}$ | 1/6 |
| 11 | " | 7.0 | " | " | $3.0 \times 10^{-7}$ | 1/53 |
| 12 | " | 8.0 | " | " | $1.7 \times 10^{-7}$ | 1/94 |
| 13 | " | 9.0 | " | " | $9.5 \times 10^{-7}$ | 1/17 |
| 14 | " | 10.0 | " | " | $1.4 \times 10^{-6}$ | 1/11 |
| 15 | 800 | 8.0 | " | " | $1.3 \times 10^{-7}$ | 1/123 |
| 16 | 200 | " | " | $2.5 \times 10^{-5}$ | $2.3 \times 10^{-6}$ | 1/11 |

TABLE 1-continued

| Run No. | Hydrazine (mg/lit.) | pH | Temp. (°C.) | Radioactive conc. (μCi/ml) Original | Final | Ratio of reduction |
|---|---|---|---|---|---|---|
| 17 | 100 | " | " | " | " | " |
| 18 | 50 | " | " | " | $3.7 \times 10^{-6}$ | 1/7 |

As is obvious from TABLE 1, it is sufficient to employ 100 mg of hydrazine per liter of the waste to lower its radioactive concentration to one-tenth if the waste has a pH level of about 8 and a temperature of 50° C. to 60° C.

COMPARATIVE EXAMPLE

The simulated waste identical to what had been tested in EXAMPLE 1 was treated with five different ion exchange resins. The same column as in EXAMPLE 1 was used, and the waste was introduced into the column at the same rate as in EXAMPLE 1. The results are shown in TABLE 2.

TABLE 2

| Run No. | Ion exchange resin Grade | Type | Radioactive conc. (μCi/ml) Original | Final | Ratio of reduction |
|---|---|---|---|---|---|
| 19 | Dowex 1 × 8 | $NO_3^-$ | $1.4 \times 10^{-5}$ | $3.3 \times 10^{-6}$ | 1/4 |
| 20 | " | $OH^-$ | " | $2.7 \times 10^{-6}$ | 1/5 |
| 21 | " | $Cl^-$ | " | $2.6 \times 10^{-6}$ | " |
| 22 | " | $SO_4^{2-}$ | " | $3.0 \times 10^{-6}$ | " |
| 23 | Diaion SK-1B | $H^-$ | " | $1.4 \times 10^{-5}$ | — |

All of the Runs Nos. 19 to 22 indicated a sharp reduction in the ratio of reduction in radioactive concentration when the amount of the waste reached 1000 ml. Therefore, each of the final concentration values shown in TABLE 2 is the average of the results obtained before the amount of the waste exceeded 1000 ml. This confirms the superiority of the method of this invention to a mere ion exchange method in the capacity of waste treatment by a unit volume of the resin, too.

What is claimed is:

1. A method of reducing the radioactive concentration of low-level radioactive waste which comprises the steps of (1) providing an iron hydroxide-cation exchange resin which has been obtained by treating a strongly acid cation exchange resin with ferric chloride and aqueous ammonia to form a product of hydrolysis of ferric ions in said resin, (2) adding hydrazine to said low-level radioactive waste in an amount of at least 100 mg hydrazine per liter of low-level radioactive waste to form a mixture, (3) adjusting the pH and the temperature of said mixture such that its pH is at least 7 and its temperature is between 50° C. and 60° C., and (4) passing said mixture through said iron hydroxide-cation exchange resin provided in step (1).

2. A method as defined in claim 1, wherein in step (2) about 400 mg of hydrazine are added per liter of said waste.

3. A method as defined in claim 1, wherein in step (3) the pH of said mixture is adjusted to about 8.

* * * * *